Figure 1:
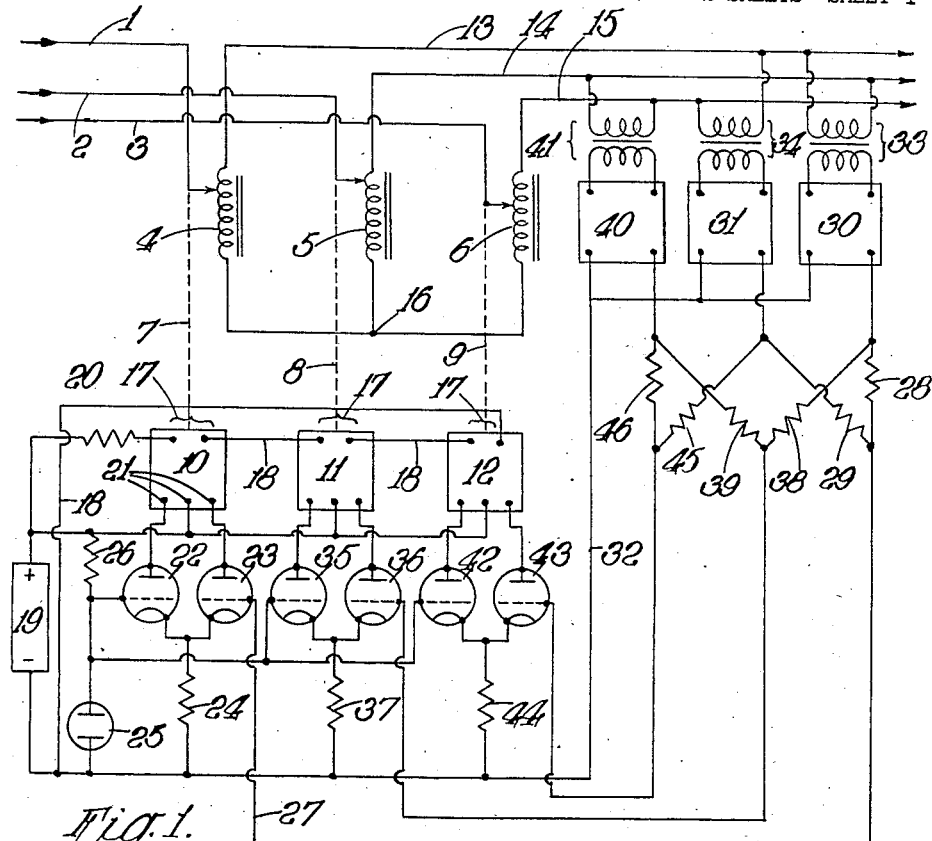

Dec. 4, 1951          E. L. C. WHITE          2,577,551
APPARATUS STABILIZING THREE-PHASE VOLTAGE SUPPLY
Filed July 22, 1948                          2 SHEETS—SHEET 1

Inventor
Eric Lawrence Casling White
By  J. C. Ollier
      Attorney

Dec. 4, 1951  E. L. C. WHITE  2,577,551
APPARATUS STABILIZING THREE-PHASE VOLTAGE SUPPLY
Filed July 22, 1948  2 SHEETS—SHEET 2

*Inventor*
Eric Lawrence Casling White
By *J. O. Ollie*
*Attorney*

Patented Dec. 4, 1951

2,577,551

UNITED STATES PATENT OFFICE 2,577,551

APPARATUS STABILIZING THREE-PHASE VOLTAGE SUPPLIES

Eric Lawrence Casling White, Iver, England, assignor to Electric & Musical Industries Limited, Hayes, Middlesex, England, a company of Great Britain Application July 22, 1948, Serial No. 40,149
In Great Britain July 25, 1947

9 Claims. (Cl. 323—22)

This invention relates to apparatus for stabilising three-phase voltage supplies.

In the construction of radio apparatus operating at high power, for example a television transmitter, a so-called constant resistance smoothing circuit such as described in United States Patent No. 2,035,457 is sometimes the most suitable for smoothing the output of the rectifier for the alternating voltage supply. Such circuits require larger condensers than simple inductance capacity smoothing circuits with the same smoothing factor, and in order to mitigate this disadvantage it has been proposed to use a three-phase voltage supply and after stabilising the supply to apply it to a three-phase or to a six-phase rectifier with a view to increasing the principal ripple frequency in the rectifier output and thereby reducing the size of the condensers required for smoothing.

However it is found in practice that this proposal is not entirely successful in increasing the principal ripple frequency and the object of the present invention is to provide improved apparatus for stabilising polyphase voltage supplies with a view to achieving this result.

In stabilising apparatus, such as commonly employed heretofore for three-phase voltage supplies, the voltage between each phase and the neutral of the supply, usually earth, is controlled in order to maintain it equal to some reference voltage which is the same for each phase. However, in the case of the usual three-phase 50 cycles per second (C. P. S.) public supply there is an appreciable tolerance both in the magnitude and the phase of the voltages so that even if the phase-to-neutral voltages are made effectively equal it is still possible for the phase-to-phase voltages to be unequal. This appears to the applicant to be the reason why, after rectification, there is not necessarily any increase in the fundamental ripple frequency in the output of the rectifier and hence why the desired advantage has not been obtained from the polyphase circuit.

According to the present invention there is provided apparatus for stabilising a three-phase voltage supply comprising means whereby inequalities in the magnitude and the phase separation of the voltages between the phases, taken cyclically, are substantially annulled.

According to one form of the present invention there is provided apparatus for stabilising a three-phase voltage supply comprising means for deriving a control voltage for each phase which is a function at least of the voltage between one phase and another phase, and means for automatically varying the voltage between each phase and the neutral of the supply in dependence upon variations of the corresponding control voltage from a predetermined value, whereby inequalities in the magnitude and the phase separation of the voltages between the phases, taken cyclically, are substantially annulled.

According to another form of the present invention there is provided apparatus for stabilising a three-phase voltage supply comprising means for deriving a control voltage for each phase which is a function at least of the voltage between one phase and another phase, and means for automatically varying the voltage between each phase and an adjacent phase in dependence upon the variations of the corresponding control voltage from a predetermined value, whereby inequalities in the magnitude and phase separation of the voltages between the phases taken cyclically are substantially annulled.

In order that the said invention may be clearly understood and readily carried into effect, it will now be more fully described with reference to the drawings, in which—

Figure 2:
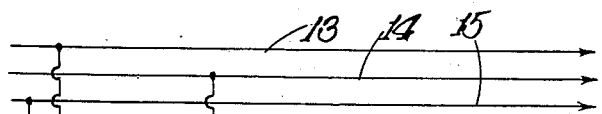
Figure 2:
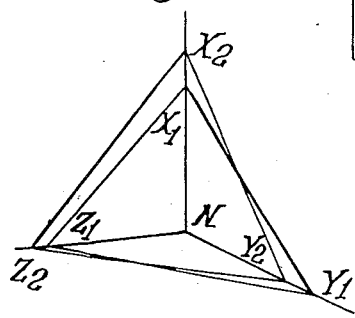
Figure 3:
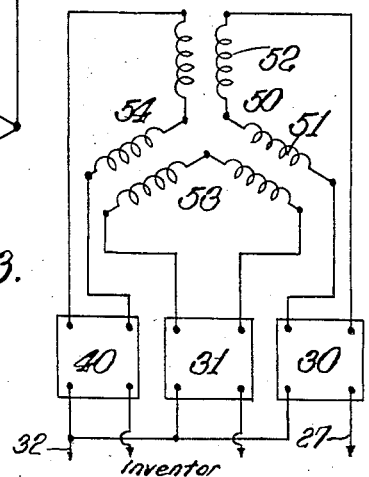
Figure 4:
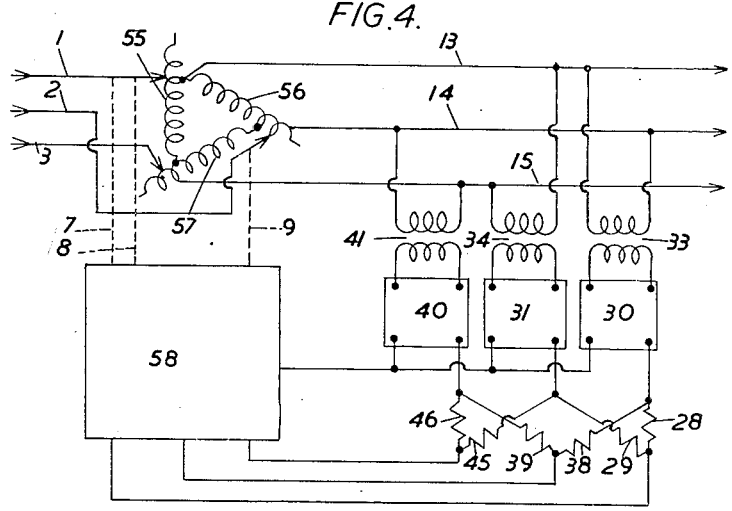
Figure 5:
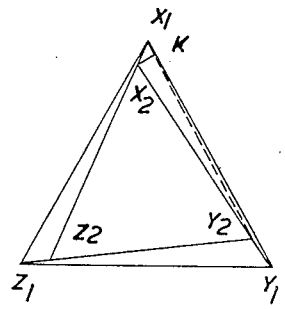

Figure 1 is a circuit diagram of apparatus according to one embodiment of the invention, Figure 2 is a vector diagram explanatory of the operation of the apparatus illustrated in Figure 1, Figure 3 illustrates a modification of part of the apparatus illustrated in Figure 1, Figure 4 is a circuit diagram of apparatus according to a second embodiment of the present invention, and Figure 5 is a vector diagram explanatory of the operation of the apparatus illustrated in Figure 4.

Referring to Figure 1 of the drawings, the voltages on the three-phases are applied to the apparatus by the input conductors 1, 2 and 3 to adjustable contacts of three independent single phase voltage regulators 4, 5 and 6 respectively. The regulators as illustrated comprise autotransformers which may be of the kind known by the registered trade-mark "Variac," and their contacts are driven via suitable transmission means indicated by the dotted lines 7, 8 and 9, by reversible electric motors of the kind known as split-field motors and indicated diagrammatically at 10, 11 and 12. The windings of the regulators 4, 5 and 6 are star-connected between the output conductors or bus-bars 13, 14 and 15 and the neutral point 16 of the supply, which may be left floating but is preferably connected to the neutral conductor of the supply (not shown) so that a low impedance is presented to the third harmonic magnetising currents in the regulators 4, 5 and 6, which all add in phase at the neutral point. The supply terminals 17 for the armatures of the motors 10, 11 and 12 are connected by conductors 18 in series with each other and with a ballast resistance 20 between the terminals of a steady potential source 19.

The two field windings of the motor 10 are connected, via supply terminals 21, in push-pull relationship between the positive terminal of the potential source 19 and the respective anodes of a pair of thermionic discharge valves 22 and 23 which have their cathodes connected via a common cathode resistance 24 to the negative terminal of said source 19. The valves 22 and 23 are shown as triodes and the control electrode of the valve 22 is connected to one terminal of a potential stabiliser 25 connected across the potential source 19, a voltage dropping resistance 26 being interposed between the stabiliser 25 and the positive terminal of the source 19. The stabiliser 25 is illustrated as a neon stabiliser, but other suitable potential stabilisers may be employed. The control electrode of the valve 23 is connected by a conductor 27 to the junction of two equal resistances 28 and 29 which bridge the higher potential output terminals of two rectifying and smoothing devices which may be of any suitable kind and are indicated diagrammatically at 30 and 31 respectively. The lower potential output terminals of each of the devices 30 and 31 is connected via a conductor 32 to the negative terminal of the potential source 19. The input to the device 30 is the voltage between the conductors 13 and 14 and is applied via an isolating transformer 33 whose primary is connected between said conductors 13 and 14. The input to the device 31 is the voltage between the conductors 13 and 15, applied via an isolating transformer 34. The potential applied to the control electrode of the valve 23 is therefore proportional to the mean value of the amplitude of the voltage between the conductors 13 and 14 and the amplitude of the voltage between the conductors 13 and 15, and the arrangement of the valves 22 and 23 is such that when the voltage applied to the control electrode of the valve 23 exceeds the reference voltage which is established across the stabiliser 25 and applied to the control electrode of the valve 22 the motor 10 is driven in one direction to operate the regulator 4 and decrease the output voltage between the conductor 13 and the neutral point 16. Conversely, when the voltage applied to the control electrode of the valve 23 is less than that applied to the control electrode of the valve 22 the motor 10 is driven in reverse direction and the output voltage on the conductor 13 relative to neutral is decreased. When the voltages applied to the control electrode of the valve 22 is equal to that applied to the control electrode of the valve 23 there is no push-pull output at the anodes of said valves, and the motor 10 is stationary.

The field windings of the motor 11 are similarly connected in push-pull to the anodes of a pair of valves 35 and 36 having a common cathode resistance 37. The control electrodes of the valves 35 and 36 are connected respectively to the stabiliser 25 and to the junction point of equal resistances 38 and 39 bridging the higher potential output terminals of the device 30 and a further similar rectifying and smoothing device 40, the lower potential terminal of the device 40 being also connected via conductor 32, to the negative terminal of the potential source 19. The input of the device 40 is the voltage between the conductors 14 and 15 and is applied, as in the case of the devices 30 and 31, via an isolating transformer 41. The motor 12 is controlled in the same way as the motors 10 and 11 by a pair of valves 42 and 43 having a common cathode resistance 44 the control voltage applied to the control electrode of the valve 43 being, however, derived from the junction point of equal resistances 45 and 46 bridging the higher potential output terminals by the devices 31 and 40. All the resistances 28, 29, 38, 39 and 45, 46 are arranged to be equal.

In Figure 2 the vectors $X_1N$, $Y_1N$, $Z_1N$, represent star-voltages, that is voltages between the conductors 1, 2 and 3 and the neutral point 16 such as might be present in the apparatus illustrated in Figure 1 and for the purpose of explanation these voltages are indicated as being equal in magnitude. The phase angle between the voltages is, however, somewhat different from 120° in each case (the difference being shown greater than likely to occur in practice, for the purposes of illustration), and the vector diagram shows that when this is so, even with the star-voltages equal in magnitude, the delta-voltages, $X_1Y_1$, $Y_1Z_1$, and $Z_1X_1$, that is the voltages between the conductors 1 and 2, 2 and 3 and 3 and 1 respectively, are unequal in magnitude. Therefore assuming a 50 C. P. S. supply the output of a three or six-phase rectifier to which the voltages $X_1N$ $Y_1N$ and $Z_1N$ were applied would still contain a ripple component having a frequency of 50 or 100 C. P. S. respectively. However, the apparatus of Figure 1 operates in such a way that if, for example, the mean value of the delta-voltages between the conductors 13 and 14 and the conductors 13 and 15 varies from the reference value established by the stabiliser 25, the motor 10 is operated to adjust the regulator 4 and cause the star-voltage between the conductor 13 and the neutral point 16 to be varied so as to reestablish equality between said mean value and said reference value. The star-voltages between the conductor 14 and the point 16, and between the conductor 15 and the point 16, are similarly varied by the regulators 5 and 6 in accordance with any variation, from the same reference value, of the mean value of the delta-voltages between the conductor 14 and the conductors 13 and 15 and between the conductor 15 and the conductors 13 and 14. This is illustrated in Figure 2 which shows that it is possible to select vectors $X_2N$, $Y_2N$, and $Z_2N$, having respectively the same direction as the vectors $X_1N$, $Y_1N$ and $Z_1N$ and such that the points $X_2$, $Y_2$ and $Z_2$ define an equilateral triangle. The delta-voltages $X_2Y_2$, $Y_2Z_2$, and $Z_2X_2$ between the output conductors 13, 14 and 15 respectively are then equal in magnitude and, since equality of angles follows, are equi-angularly spaced. If the output voltages on the conductors 13, 14 and 15 are then applied to a three or six-phase rectifier arranged in the usual way, the 50 or 100 C. P. S. ripple frequency (as the case may be) cancels out. Of course it will be appreciated that if any of the star-voltages between the input conductors 1, 2 and 3 and the point 16 vary in magnitude the apparatus also operates to adjust the regulators 4, 5 and 6 until all of the delta-voltages between conductors 13, 14 and 15 are once more substantially equal in magnitude.

In the apparatus illustrated in Figure 1 the regulators 4, 5 and 6, instead of being auto-transformers may be of any other suitable kind, for example tapped transformers, induction or "moving coil" regulators or in some cases saturated core reactors. Furthermore the isolating transformers 33, 34 and 41 may be combined into a single three-limb transformer. In another modification of the apparatus illustrated in Figure 1, instead of obtaining the mean value of the outputs of separate rectifying and smoothing devices, such as 30 and 31 for example, each rectifying and smoothing device may have applied to it the amplitude of the vector sum of the voltages between the corresponding conductor and the other two conductors. For example the input for each said device may be derived from two isolating transformers having their primary windings connected between the appropriate output conductors and having their secondary windings connected in series and in requisite polarity, but preferably in practice a single three-limb transformer is employed for all three rectifiers instead of the isolating transformers, as illustrated in Figure 3.

In this figure the limbs 47, 48 and 49 of the primary winding of the transformer are delta-connected between the output conductors 13, 14 and 15 as shown. The first secondary winding 50 comprises two series connected limbs 51 and 52 coupled respectively to the limbs 47 and 48 of the primary winding, and the voltage generated across the said secondary winding 50 is proportional to the vector sum of the voltages between the conductors 13 and 14 and the conductors 13 and 15, and is applied at the input of the device 30. The output of the device 30 is applied directly to the control electrode of the valve 23 by the conductor 27. Similarly the devices 31 and 40 receive their inputs from two-limb secondary windings 53 and 54 respectively and have their outputs applied directly to the control electrodes of the valves 36 and 43 respectively. The limbs of the secondary winding 53 are coupled to the limbs 47 and 49 of the primary winding, while the limbs of the secondary winding 54 are coupled to the limbs 48 and 49 of the primary winding.

The use of the mean of the amplitudes of the voltages between the conductors 13 and 14 and the conductors 13 and 15 as in Figure 1, or the amplitude of the vector sum of the latter two voltages as in Figure 3, as the control voltage for the voltage between the conductor 1 and the neutral point 16, and similarly for the other phases, has the advantage that the control voltage, while being a function of at least one phase-to-phase voltage, varies in response to the magnitude of a vector having approximately the same direction or phase as the voltage to be controlled, and more closely related to it than a control voltage derived only from one phase-to-phase voltage.

The motors 10, 11 and 12 will in general be provided with a suitable form of damping device to prevent the apparatus from hunting, for example the motors may be provided with built-in generators which when suitably connected to the amplifiers are arranged to provide velocity feedback.

In the embodiment of the invention illustrated in Figure 4 the control voltages obtained from the rectifying and smoothing devices 30, 31 and 40 are utilised to vary the delta voltage applied to the conductors 13, 14 and 15 from the conductors 1, 2 and 3. The star-connected voltage regulators 4, 5 and 6 of Figure 1 are replaced by regulators 55, 56 and 57 whose windings are delta connected to the conductors 13, 14 and 15 as shown. The adjustable contacts of the regulators are driven by thermionic-valve controlled motors in the same way as in Figure 1 and this part of the apparatus is therefore shown merely in block form at 58. The remaining parts of the apparatus are also similar to Figure 1 and corresponding parts bear the same reference numerals but, for a reason which is referred to hereinafter, the values of the resistances 28, 39 and 45 are respectively twice the values of the resistances 29, 38 and 46, the latter three resistances being equal.

In Figure 5 the vectors $X_1Y_1$, $Y_1Z_1$ and $Z_1X_1$ represent delta voltages, unequal both in magnitude and in phase separation, such as might be present in the input conductors 1, 2 and 3 of the apparatus illustrated. The apparatus in Figure 5 operates to maintain the delta voltages $X_2Y_2$, $Y_2Z_2$ and $Z_2X_2$ in the output conductors 13, 14 and 15 all substantially equal to a predetermined value and hence substantially equally spaced in phase and it will be apparent from Figure 5 that this condition can be obtained by operating the regulators 55, 56 and 57 so that voltages applied to the output conductors by the regulators 55, 56 and 57 are equal to $X_2Y_2$, $Y_2Z_2$ and $Z_2X_2$ respectively. The operation of the regulator 55, say, will not only vary the voltage between the conductors 13 and 15 but will vary the voltage between the conductors 13 and 14, by approximately half the amount by which the voltage between the conductors 13 and 15 is varied. This is illustrated in Figure 5 where it is shown that if $Z_2X_2$ is increased to $Z_2X_1$, $Y_1X_2$ is simultaneously increased to $Y_1X_1$, the effective increase $X_1K$ where $X_2K$ is perpendicular to $X_1Y_1$ of $Y_1X_2$ being approximately equal to $X_2X_1$ multiplied by co-sine angle $X_2X_1K$. This angle will not differ appreciably from 60° and therefore the increase in $Y_1X_2$ will be approximately half the increase in $Z_2X_2$. Operation of the regulator 55 to annul a variation in the voltage between the conductors 13 and 15 from the predetermined value, will therefore entail an operation of the regulator 56 to annul the consequent variation effected in the voltage between the conductors 13 and 15, and will in turn entail an operation of regulator 57. However the equilibrium position corresponding to the vectors $X_2Y_2$, $Y_2Z_2$, $Z_2X_2$ being substantially equal is rapidly attained since each regulator halves the change required to be effected by the next regulator. The rate at which the equilibrium position is approached following a variation in any of the output delta voltages is increased by arranging that the control voltage which is compared with the reference voltage set up across the neon-stabiliser 25 (Figure 1) to control the operation of, say, the regulator 55 is proportional to the sum of two thirds the amplitude of the voltage between the conductors 13 and 15 and one third the amplitude of the voltage between the conductors 13 and 14 and similarly for the other regulators, control voltages of the required values being obtained by making the resistances 28, 39 and 45 twice the resistances 29, 38 and 46, as above described. In consequence of this arrangement if any one output delta voltage varies from the predetermined value, all the voltage regulators are simultaneously set in operation and the consequent variations caused in the other delta voltages are to a large extent self cancelling.

What I claim is:

1. In a three phase voltage supply network, apparatus for stabilising the phase voltages of the supply, comprising three voltage regulators arranged to control the respective phase voltages, means for deriving signals representative of each delta voltage in the network, means for combining said signals to generate a control signal for each regulator, each control signal being a function of at least two of the delta voltages of said supply, means for setting up a substantially fixed reference voltage, means for comparing each of said control signals with the reference voltage, and means for operating each regulator in response to any difference between its control signal and the reference voltage to maintain said delta voltages substantially equal to one another.

2. In a three phase voltage supply network, apparatus for stabilising the phase voltages of the supply, comprising three voltage regulators arranged in star relationship with respect to the phase conductors of said network so that each of said regulators is adapted to control directly the star voltage between one of said phase conductors and the neutral of the supply, means for deriving signals representative of the delta voltages in the network, means for combining said signals to generate a control signal for each regulator, each control signal being a function of both the voltages between the respective phase conductor of said network and the other two phase conductors, and means for operating each regulator in response to its control voltage to maintain said delta voltages substantially equal to one another.

3. In a three phase voltage supply network, apparatus for stabilising the phase voltages of the supply, comprising three voltage regulators arranged in star relationship with respect to the phase conductors of said network so that each of said regulators is adapted to control directly the star voltage between one of said phase conductors and the neutral of the supply, means for deriving signals representative of the delta voltages in the network, means for combining said signals to generate a control signal for each regulator, each control signal being proportional to the mean of the amplitudes of both the voltages between the respective phase conductor and the other two phase conductors of said network, and means for operating each regulator in response to its control signal to maintain said delta voltages substantially equal to one another.

4. In a three phase voltage supply network, voltage stabilising apparatus comprising three voltage regulators arranged in star relationship with respect to the phase conductors of said network so that each of said regulators is adapted to control directly the star voltage between one of said phase conductors and the neutral of the supply, means for deriving signals representative of the delta voltages in the network, means for combining said signals to generate a control signal for each regulator, each control signal being proportional to the magnitude of the vector sum of the two voltages between the respective phase conductor and the other two phase conductors of said network, and means for operating each regulator in response to its control signal to maintain said delta voltages substantially equal to one another.

5. In a three phase voltage supply network, voltage stabilising apparatus comprising three voltage regulators arranged in delta relationship with the phase conductors of said network so that each of said regulators is arranged to control directly the delta voltage on one of said phase conductors relative to another of said phase conductors, means for deriving signals representative of the delta voltages in the network, means for combining said signals to generate a control signal for each regulator, each control signal being a function of both the delta voltages on the respective phase conductor relative to the other two phase conductors of said network, and means for operating each regulator in response to its control signal to maintain the delta voltages substantially equal to one another.

6. In a three phase voltage supply network, apparatus for stabilising the phase voltages of the supply, comprising three voltage regulators arranged in delta relationship with the phase conductors of said network so that each of said regulators is arranged to control directly the delta voltage on one of said phase conductors relative to another of said phase conductors, means for deriving signals representative of the delta voltages in the network, means for combining said signals to generate a control signal for each regulator, each control signal being proportional to the sum of two-thirds the delta voltage directly controlled by the respective regulator and one-third the voltage between the respective phase conductor and the remaining phase conductor, and means for operating each regulator in response to its control signal to maintain the delta voltages substantially equal to one another.

7. In a three phase voltage supply network, apparatus for stabilising the phase voltages of the supply, comprising voltage regulators arranged to control the respective phase voltages, means for deriving signals representative of the delta voltages in the network, means for combining said signals to generate a control signal for each regulator, each control signal being a function of at least two of the delta voltages, and means for operating each regulator in response to its control signal to maintain said delta voltages substantially equal to one another.

8. In a three phase voltage supply network, apparatus for stabilising the phase voltages of the supply, comprising three voltage regulators arranged to control the respective phase voltages, means for setting up a control voltage for each regulator responsive respectively to variations in the delta voltages in the network, said means including rectifiers whereby said control voltages are direct current voltages, means for setting up a substantially fixed direct current reference voltage, thermionic valve means for comparing each control voltage with the reference voltage and for amplifying the difference between the compared voltages, and means responsive to the output of said thermionic valve means to operate said regulators to maintain and delta voltages substantially equal to one another.

9. A three phase supply network including apparatus according to claim 8, said thermionic valve means comprising a pair of thermionic valves for each control voltage, each valve having at least an anode, a control electrode and a cathode, a common cathode impedance in series with each pair of valves coupling said valves at their cathodes, means for applying the respective control voltage to the control electrode of one valve of each pair, means for applying the reference voltage to the control electrode of the other valve of each pair, and means for operating the respective voltage regulator in response to anode current variations in at least one valve of the respective pair.

ERIC LAWRENCE CASLING WHITE.

REFERENCES CITED

The following references are of record in the file of this patent:

UNITED STATES PATENTS

| Number | Name | Date |
|---|---|---|
| 1,551,270 | Slepian | Aug. 25, 1925 |
| 2,239,768 | Artzt | Apr. 29, 1941 |